United States Patent [19]

Heiz

[11] Patent Number: 4,551,356

[45] Date of Patent: Nov. 5, 1985

[54] PROCESS FOR PRODUCING AN ANTIREFLECTING LAYER ON VIEWING SCREENS

[75] Inventor: Hans Heiz, Dagmersellen, Switzerland

[73] Assignee: Therese Heiz, Dagmersellen, Switzerland

[21] Appl. No.: 540,561

[22] PCT Filed: Feb. 1, 1983

[86] PCT No.: PCT/EP83/00026

§ 371 Date: Oct. 3, 1983

§ 102(e) Date: Oct. 3, 1983

[87] PCT Pub. No.: WO83/02682

PCT Pub. Date: Aug. 4, 1983

[30] Foreign Application Priority Data

Feb. 1, 1982 [DE] Fed. Rep. of Germany ....... 3203291

[51] Int. Cl.$^4$ ............................ B05D 5/06; B05D 5/12
[52] U.S. Cl. ...................................... 427/64; 427/157; 427/162; 427/397.8
[58] Field of Search ................... 427/157, 64, 108, 68, 427/162, 163, 164, 168, 165, 169, 389.7, 397.8; 428/446, 428, 440

[56] References Cited

U.S. PATENT DOCUMENTS

| | | | |
|---|---|---|---|
| 2,428,357 | 10/1947 | Cohen | 427/169 |
| 2,689,804 | 9/1954 | Sadowsky | 427/165 |
| 2,707,687 | 5/1955 | Lockwood et al. | 427/157 |
| 3,326,715 | 6/1967 | Twells | 427/108 |
| 3,526,530 | 9/1970 | Sams et al. | 427/165 |
| 3,635,751 | 1/1972 | Long et al. | 427/108 |
| 3,940,511 | 2/1976 | Deal et al. | 427/165 |

FOREIGN PATENT DOCUMENTS 538274 7/1941 United Kingdom .

*Primary Examiner*—S. L. Childs
*Attorney, Agent, or Firm*—Oblon, Fisher, Spivak, McClelland & Maier

[57] ABSTRACT

Process for producing antireflection layer on viewing screens. A film-like layer of a varnish containing first agent is put on the outer side of the screen and while this layer is still wet it is processed with a second agent in the form of a dispersion in water of a silicate or a silicic acid, the second agent being such as to take part in a reaction with the first agent while it is on the screen. It is furthermore possible for the two agents to be mixed and then put on. Whichever of the two possible forms of the method is used, one may be certain of producing a cured or hardened layer greatly cutting down reflection.

9 Claims, No Drawings

PROCESS FOR PRODUCING AN ANTIREFLECTING LAYER ON VIEWING SCREENS

BACKGROUND OF THE INVENTION

The present invention is with respect to a process for forming an anti-reflecting layer on a viewing screen, which without such a layer would be the cause of trouble on viewing because of reflected rays coming from the screen.

ACCOUNT OF THE PRIOR ART

The undesired effect of light reflected by a viewing screen is something which may be experienced every day even in the home. However viewing screens, as for example in the form of CRT's, are becoming more and more important in other fields as well, as for example in offices, in industrial plant, for scientific work, in traffic systems, as for example in connection with airlines, and in closed circuit TV systems for the observation of persons and places, in which case as well troublesome reflection effects are likely. The cause of such effects is light coming from a badly designed lighting system and reflected at the viewing screen, such reflected light then making it harder to see the picture or image on the screen. This is likely to be a source of trouble for the viewer, possibly in the form of pains in the eyes and head and there is a strong feeling of generally being unwell, so that if the person in question is at work he will do very much less well.

There have certainly been enough attempts at stopping completely or in any event cutting down the reflexion of a viewing screen, as for example by "dereflecting" of "demirroring" it, and one way of doing this is by putting on a thin layer of a transparent lacquer. However, coatings produced by lacquers designed for this purpose are not resistant to chemical and mechanical cleaning materials. Again, another suggestion has been to have an uneven but regular surface on the viewing screen itself or to have a front screen (with such a surface on it) fixed in front of the viewing screen, such a fine, regular but uneven surface then dispersing the rays which would otherwise be reflected. In this case the thing reflected will no longer be made out or at any rate will not be seen clearly. Making such a uneven, regular structure on the surface of the front screen or the viewing screen itself is however a relatively complex process. A front screen may be flat so that on using it with a curved viewing screen the distance therebetween will not be the same at every point and the viewing screen image itself will be unclear. To take care of this trouble, one design of front screen has been put forward in the past that was etched on the one or two sides thereof, it having a spherical curvature in keeping with that of the viewing screen; if the front screen was only etched on one side, this side was then turned towards the viewer, see German Offenlegungsschrift specification No. 2,723,788. However such a front screen may not be used with viewing screens not having the same curvature.

In keeping with a further known suggestion the reflecting effect was to be put an end to by having a net on the screen, see German Offenlegungsschrift specification No. 2,712,321. However the net mesh size was at the most equal to the spacing between the image elements themselves. In a direction normal to the line direction this spacing was equal to the line spacing, and in the line direction the spacing was dependent on the upper frequency limit of the transmitted video signal and the size of the viewing screen. It was best for the net to have a dark color and for it to be made of elastic threads. Although being able to be used on any viewing screen, such a net readily took up dust and did not give the full desired anti-reflecting effect.

ACCOUNT OF THE INVENTION

One purpose of the present invention is that of designing a process which, while being simple and being able to be undertaken cheaply, at the same time gives a highly efficient anti-reflecting layer on a viewing screen.

In keeping with the invention, and for effecting this and further purposes:

(I) a film-like layer of a first agent (named the A agent herein)
  containing a varnish is put on the outer face of the viewing screen
  and while this film-like layer is still in a wet or undried condition
  it is processed with a second agent (named the B agent herein) in the form of an aqueous suspension having the property of reacting with the varnish and containing a silicate or a silicic acid
(II) or a fresh mixture of the A and B agents is put on the said viewing screen at its outer face.

Herein the wording "viewing screen" is used in its broadest possible sense. It is mainly a question of the viewing screens of CRT's, on which reflections are responsible for undesired effects. The screens may be the screens of television sets, word processors, monitors, oscillographs, x-ray apparatus and the like using a cathode ray trace produced by a beam deflection system.

For undertaking the process of the invention it is in all cases necessary to have the two agents (A) and (B) as noted hereinbefore for producing an anti-reflecting layer on the viewing screen. In this respect, as will have been seen, there are two possible ways of using the invention. In the case of one possible form thereof, a film-like layer of the varnish-containing agent is put on and then while it is still in a wet condition this film-like layer is processed with the further agent containing, in aqueous dispersion, a silicate or a silicic acid. The silicate or the silicic acid then takes part in a chemical reaction with the varnish and after a drying stage and some further time, which as a rule will be some hours, the outcome will be a generally completely cured antireflexion layer or coating. For the reaction between the reaction partners named hereinbefore to be possible, the film-like layer, that in the first place has been formed of the agent containing the varnish, is not to be allowed to become completely dry, that is to say, it is still to have some degree of moisture therein. If one does not keep to this condition, the desired effect will not be produced or will be produced only in part.

In a further way of using the process of the invention, the two agents, that is to say the A agent on the one hand and B agent on the other hand, designed for reaction with each other, are mixed with each other and the mixture is put on the screen as the said film-like layer, the same changing then into a solid condition in the form of an anti-reflecting layer. In this connection it is best for the mixture to produced directly before the use thereof, seeing that otherwise the reaction between the said reaction partners will have a chance of going so far that the effect desired in keeping with the invention will not be so well produced. This being so, the mixture used is to be as fresh as possible.

Herein the word "varnish" is used in the sense of materials in keeping with the normal definition. In fact in DIN 55,945 (German Industrial Standard) sheet 1 (of November 1968) the definition of a varnish is given as a general term for unpigmented coating materials containing oils or resin solutions or mixtures thereof. It is said in the said Standard that varnishes are to be so named that part of the name makes clear the nature of the varnish. The most important varnish, namely linseed oil varnish, is a form of linseed oil with the addition of driers or precursors thereof, such addition having been made at a temperature of 140 to 150 deg C.

It is of the nature of varnishes that they have very good drying properties. Generally the word varnish is used in the sense of an oil whose drying properties have been greatly stepped up by the addition of driers, siccatives or precursors of driers. Such varnishes are liquids that are put on in a thin layer, that undergoes chemical and physical changes to give solid or strong layer sticking to the structure coated therewith (see Roempps Chemie-Lexikon (Roempp's Dictionary of Chemistry) 7th. edition, vol. 2, page 1129).

Different additions may be made to the varnish-containing A agent, the only property that such additions have to have being that they do not have any undesired effect on the reaction as noted hereinbefore between the varnish and silicate or the silicic acid, whichever is used.

Possible adjuvants that may be used as well are for example mineral oils or mineral oil-like substances, the same having the property of a dispersant and acting with the further function of a drying-retardant. Herein the wording "mineral oil" is used as a general term for liquid products of distillation produced from mineral raw materials (petroleum, ozocerite, brown and other coals, wood and peat) that in the main are made up of a mixture of saturated hydrocarbons. Mineral oil-like substances are to be substances that in connection with their chemical and physical properties may be said to be like mineral oils. One dispersant whose properties are of special value is liquid paraffin, this being a clear, colorless, oil-like mixture of hydrocarbons with a density of at least 0.88 and a boiling point of at least 360 deg. C, it being insoluble in water and alcohol and being soluble in ether, benzene, chloroform etc.

The A agents may furthermore have opacifying substances or substances for stepping up the matting effect (that is to say the property of making the coating mat) in them. In this case the anti-reflecting layer to be produced on the viewing screen will be less transparent, this again being something decreasing light reflexion and light dispersal. The amount of the opacifying substance is however not to be so high that there is drop in the quality of the image. A preferred opacifying substance is jasmine oil of the "a" quality grade, even although it is not one of the standard opacifiers. It is a reddish brown, wax-like oil produced from jasmine flowers (see the said Roempps Chemie-Lexikon, vol. 3, page 1660). More specially, an effect of great value may be produced if a substance with an antistatic effect is mixed into the A agent, it having turned out that more specially silicone oils may be used for this purpose, inasfar as they do not have any undesired effects on the curing reaction noted earlier. Silicone oils of the sort here of interest for the invention are as a rule linear-polymeric dimethylsiloxanes or less frequently methyl-phenylsiloxanes as well, that are generally clear, colorless, neutral, odorless and hydrophobic liquids with a molecular weight of 1000 to 150,000, a density of 0.94 to 0.97, and a viscosity of $0.1 \times 10^{-2}$ sq. m/s to $15 \times 10^{-2}$ sq. m/s. They are soluble in benzene, toluene and aliphatic normal or chlorinated hydrocarbons. While not being very resistant to strong inorganic acids and bases, they are resistant to salts, some oxidizing agents and soaps. They let through gases and are water-repellant (see the said Roempps Chemie-Lexikon, vol. 5, page 3226). An antistatically acting substance that has turned out to be of special value is Baysilonoel A.

The amounts of the said substances whose addition is made to the A agent are not critical. In any event however the main component of the A agent is to be the varnish, its amount being such that, as noted earlier, there are no undesired effects on the said curing reaction.

The main component of the B agent is made up by the silicates and/or silicic acids having the property of producing a reaction with the varnish. In this connection a useful effect is possible if the level of water in the B agent is as low as possible. It is generally unimportant if there is a small amount of silicate or silicic acid that has changed into a gel or suspended form, although it is best to have a homogeneous colloidal dispersion or solution-dispersion. Silicates which have specially good properties for use in the invention are solutions of sodium waterglass and potassium waterglass in water. The word "waterglass" is used in respect of vitreous, water soluble potassium and sodium silicates produced by a process of melting or their syrup-like solutions in water. In a pure condition waterglasses are transparent, colorless glasses, that as trade products are tinted with traces of iron so as to be brownish to reddish or even yellow. At a raised temperature and pressure they may be changed into clear colloidal solutions having a strong alkaline reaction. They are not soluble in cold water so that it is best for them to be generally completely dispersed, at least at room temperature, in the aqueous medium of the A agent, if possible after heating (see the said Roempps Chemie-Lexikon, vol. 6, page 3883). If there are silicic acids in the B agent, they are not to be so processed that they are changed into higher silicic acids by cleavage of water to such a degree that the curing reaction with the varnishes would then not be possible. If, to take an example, orthosilicic acid is used, then it is best make a pH adjustment of the aqueous phase of the B agent to 3.2, because it is at this pH value that one may be certain of the silicic acid being stable for some time. As a general point, it is naturally possible for the different salts of known silicic acids to be used on condition of their taking part in the said reaction with the varnish. In this connection it will more specially be a question of the water-soluble salts of orthosilicic acid, metasilicic acid and disilicic acid and more limitedly of alkali metal silicates of which the sodium and potassium silicates are more specially to be used.

A surprising discovery made in the development of the present invention is the fact that a combination of sodium waterglass and potassium waterglass has specially good properties, the amounts of such starting materials or components used therein being best made roughly equal so as to give a further unlikely seeming effect inasfar as the overall effect produced by the two components is greater and better than the effects of the two components taken separately, so that it may be said that the said effect is synergistic.

The addition of further substances to the B agent is possible, such further substances best being water-soluble and not in any way stopping the said curing reaction.

For producing a more pleasing coloring effect on the viewing screen, fluorescent substances may be put in, it being best only to have small amounts of them. Materials that are more specially preferred because of there useful properties are fluorescein and its derivatives. Taking an example, the amount of fluorescein may be put in at a level of roughly 0.5% by weight.

Lastly, a useful effect may furthermore be had if a normal dyestuff or coloring material is put in the B agent and if desired or necessary in the A agent as well, the color of the said coloring material being in keeping with the coloring of the viewing screen in question. A man trained in the art will be quite free to make his own selection of the coloring material that will be best in any given case. And in fact he will have little trouble in making up his mind on this point on a case-to-case basis. The color that has turned out to be very useful in the case of television CRT'S is nero brown (named nut brown mordant, nut brown or juice brown as well). Nero brown is a dyestuff produced from the alkali salt of humic acids, that is in turn produced by the addition of lye to Van Dyke or Cassel brown so as to give black shining scales in the form of 85% humic acid and which give a brown solution in water (see the said Roempps Chemie-Lexikon, vol. 4, page 2304). As rule smallish amounts as for example of 0.5% by weight of this dyestuff will be used.

As for working out the amounts of the two A and B agents noted hereinbefore necessary for producing the effect and purpose of the present invention, a man versed in the art will have no trouble in this respect if he undertakes a small number of simply-run tests. As a rule the preferred amount of silicate or silicic acid (on a dry matter basis) will be at the rate of one part by weight thereof to one part by weight of the said varnish. As a further guiding rule it would be possible to say that any amount of silicate or silicic acid in a range of 1 to 2 parts by weight may be taken for an amount by weight of varnish in a range of 1 to 2 parts by weight. In some cases however amounts outside of these ranges may be taken. The precentage amounts of the other, further or auxiliary components as noted hereinbefore, are best made as low as possible to make certain that they will have no undesired effects on the said curing reaction that is needed. Presently little is known about the nature of this reaction.

The overall amount of the A and B agents to be put on one square meter of viewing screen surface may be of the order of 3 grams, this giving an anti-reflecting layer or coating with a thickness of some microns.

For putting on the A and B agents, possibly in the form of a mixture, a piece of cloth or a sponge may be used, care being taken however in this respect to see that, in any event, the material of which such cloth or sponge is made is not taken up in the solution to become part of the film-like layer or anti-reflecting coating and be responsible for undesired effects therein. Generally however the material of such cloth or the like used for putting on the antireflexion coating does not have to keep to any special conditions.

The specially useful effect for which the process in keeping with the present invention is responsible is that no expert knowledge is necessary for undertaking it and in fact everybody will be in the position of using the process quite simply and with no trouble to get the desired technical effect of more or less completely putting an end to the reflecting effect of a viewing screen. A further point is that the process of the present invention gives further effects which, in the first place, would have seemed quite unlikely to be produced. On this point it is to be noted while testing the process of the invention there was next to no effect on the pulse jump reproduction, that is to say the reproduction of extreme level differences in the video signal, that the decrease in the depth of modulation is very low and that the reproduction at the margins is kept at a good level. Static charging of the viewing screen is made less great or even put an end to completely and harmful radiation, that might have an undesired effect on the viewer, is shut off to a very high degree, that is to say up to 90% or even higher. The anti-reflecting layer put on the viewing screen in keeping with the present invention has no bad effects on the reproduction of colors and the sharpness of the TV picture.

One effect of the anti-reflecting coating is that a screen may be freely put at any desired point and in a factory or in an office the workspace may be arranged to take the latest scientific work and knowledge into account.

The useful effects noted hereinbefore are produced with starting materials that are completely free of any poisons, are not responsible for any damage to the skin or the mucous membranes, do not give off any harmful amounts of vapor and have no damaging effect on glass or any other materials. If desired the antireflexion layer or coating may be taken off again. Normally it does not have to be renewed.

A further account of the invention will now be given taking two examples of it.

EXAMPLE 1

Firstly a viewing screen with an area of 0.64 sq.m. was cleaned using a soft dry cloth. Nextly the A agent made up of:
(1) 65% by weight of linseed varnish,
(2) 30% by weight of liquid paraffin,
(3) 4.5% by weight of jasmine oil and
(4) 0.5% by weight of Baysilonoel A (silicone oil) was put on using a sponge at the rate of 1.5 grams in all for the full screen.

1.5 grams of the B agent were put on this layer while it was still wet. The B agent was made up of:
(1)
  59% by weight of sodium waterglass (sodium silicate),
  40% by weight of potassium waterglass (potassium silicate),
(2) 0.5% by weight of fluorescein and
(3) 0.5% by weight of nero brown.

In this case as well the agent was put on with a sponge. It was spread out by pressing and rubbing in till there was a homogeneous and even layer on the screen, curing of the anti-reflection layer starting thereafter. In its cured form the anti-reflecting layer put an end to undesired reflection effects to a very high degree.

EXAMPLE 2

A further screen as cleaned with a soft dry cloth and the two agents, namely A and B, were mixed and then at once put onto the viewing screen evenly and rubbed in, the amount being 3 grams, so that the anti-reflecting layers would be formed, curing then starting and giving a cured anti-reflecting layer that generally completely put an end to reflecting effects.

The embodiments of the invention in which an exclusive property or privilege is claimed are as follows.

I claim:

1. A process for producing an anti-reflecting layer on a viewing screen which comprises:
   (a) coating an outer face of said viewing screen with a layer of a composition comprising linseed oil varnish, and then processing said layer, while still wet, with a composition comprising an alkali metal silicate or a silicic acid, which is capable of reacting with said varnish composition; or
   (b) coating an outer face of said viewing screen with a layer of a mixture of the composition comprising linseed oil varnish and the composition comprising an alkali metal silicate or silicic acid.

2. The process as claimed in claim 1 wherein said alkali metal silicate is a viscous solution in water of the alkali metal silicate.

3. The process as claimed in claim 2, wherein said alkali metal silicate is a combination of potassium and sodium silicates.

4. The process as claimed in claim 1, wherein said linseed oil contains a dispersant.

5. The process as claimed in claim 4, wherein said dispersant is liquid paraffin.

6. The process as claimed in claim 1, wherein said linseed oil contains an opacifying agent, an antistatic agent or a mixture thereof.

7. The process as claimed in claim 1, wherein said alkali metal silicate or silicic acid is compounded with fluorescent or coloring substances or a mixture thereof for optically matching the anti-reflecting layer to the viewing screen.

8. The process as claimed in claim 6, wherein said opacifying agent is jasmine oil.

9. The process as claimed in claim 6, wherein said antistatic agent is a linear polymeric dimethyl siloxane or methyl phenyl siloxane having a molecular weight of 1000 to 150,000 and a viscosity of $0.1 \times 10^{-2}$ sq. m/s to $15 \times 10^{-2}$ sq. m/s.

* * * * *